United States Patent [19]

Hanmura

[11] 4,233,602
[45] Nov. 11, 1980

[54] MULTI-MATRIX DISPLAY SYSTEM HAVING MATRIX DISPLAY PANEL WITH UNCROSSED CONNECTIONS ON SUBSTRATES

[75] Inventor: Hisao Hanmura, Hitachi, Japan
[73] Assignee: Hitachi, Ltd., Japan
[21] Appl. No.: 891,036
[22] Filed: Mar. 28, 1978
[30] Foreign Application Priority Data
Mar. 30, 1977 [JP] Japan .................................. 52/34438
Feb. 8, 1978 [JP] Japan .................................. 53/12453
[51] Int. Cl.³ .............................................. G06F 3/14
[52] U.S. Cl. ................................... 340/752; 340/753; 340/766; 340/814; 340/166 EL
[58] Field of Search ......... 340/324 RM, 336, 166 EL, 340/753, 814, 752

[56] References Cited
U.S. PATENT DOCUMENTS

| | | | |
|---|---|---|---|
| 3,760,403 | 9/1973 | Kippenhan | 340/324 M |
| 3,934,241 | 1/1976 | Weigert | 340/753 |
| 4,060,801 | 11/1977 | Stein et al. | 340/753 |

Primary Examiner—Marshall M. Curtis
Attorney, Agent, or Firm—Craig & Antonelli

[57] ABSTRACT

A structure of a multi-matrix display panel having picture elements arranged in matrix and a multimatrix display system using the matrix display panel are disclosed. Scanning signals are applied to a plurality of row electrodes of the matrix and brightness modulated signals are applied to a plurality of column electrodes of the matrix to control the brightnesses of desired picture elements. The sequence of connection of the column electrodes to the picture elements is reversed from row electrode to row electrode and the sequence of application of drive signals for driving the matrix display panel is also reversed accordingly. The opposing picture elements in two adjacent rows are integrated to reduce the number of picture elements for providing a structure which does not need three-dimensional interconnection of the electrodes or a detoured wiring.

5 Claims, 15 Drawing Figures

MULTI-MATRIX DISPLAY SYSTEM HAVING MATRIX DISPLAY PANEL WITH UNCROSSED CONNECTIONS ON SUBSTRATES

LIST OF PRIOR ART REFERENCES (37 CFR 1.56 (a))

The following references are cited to show the state of art:

(1) Copending U.S. Application Ser. No. 683,278 filed by Hideaki Kawakami on May 5, 1976 and assigned to the same assignee as that of the present application, entitled as "Liquid Crystal Display Panel".

(2) Japanese Patent Laid-Open No. 115198/77

The present invention relates to a structure of a matrix display panel for matrix-displaying characters and/or image and a matrix display system using the display panel, and more particularly to a multi-matrix display panel of a structure which does not require three-dimensional interconnection of electrodes or a detoured wiring and is easy to fabricate and a reversal multi-matrix display system using such a display panel.

The present invention will be apparent from the following detailed description taken in conjunction with the accompanying drawings, in which.

A matrix display system utilizes a display panel which uses a liquid crystal, electroluminescence element or plasma as a display medium.

Figure 1A:
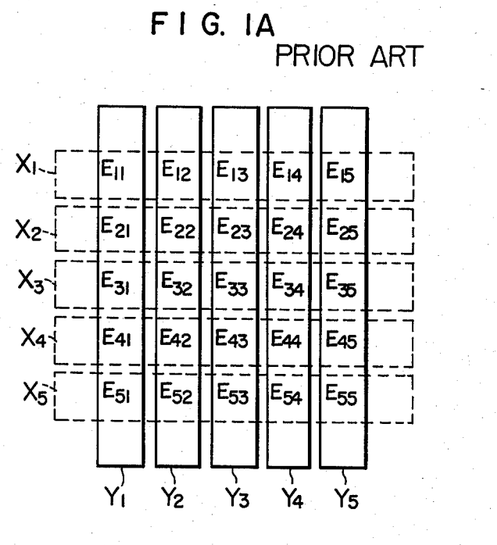
FIG. 1A shows a plan view illustrating a structure of a prior art simple matrix display panel.
Figure 1B:
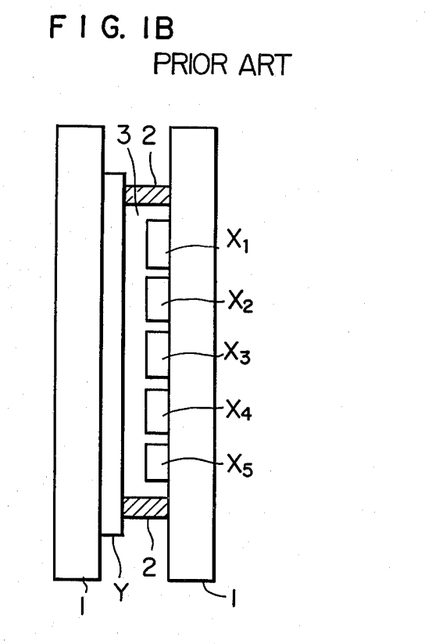
FIG. 1B shows a side elevational view of the structure of FIG. 1A.

FIGS. 1A and 1B show a structure of a display panel in a prior art matrix display system. In FIG. 1B, a pair of glass substrates 1 are spaced from each other by a spacer 2 and a display medium 3 such as liquid crystal or electroluminescence element is contained therebetween. Transparent row electrodes $X_1-X_5$ and column electrodes $Y_1-Y_5$ are arranged on the glass substrates 1 to define picture elements $E_{11}-E_{55}$ at the crosspoints of those electrodes. The display panel is driven in a line sequential mode. Namely, the row electrode $X_1$ is selected first and the picture elements $E_{11}-E_{15}$ are selectively fired by applying signals to selected ones of the column electrodes $Y_1-Y_5$. In the next cycle, the row electrode $X_2$ is selected and the picture elements $E_{21}-E_{25}$ are selectively fired in the same manner. Similarly, the row electrodes $X_3$, $X_4$ and $X_5$ are sequentially selected while the voltages are selectively applied to the column electrodes $Y_1-Y_5$. When the row electrode $X_5$ has been selected, the scan of one field is completed. Since the firing period of the respective picture element is 1/5 (or 1/M where M is the number of rows of the picture elements) of the total cycle, this method has a drawback in that the brightness of the picture is low and a contrast ratio is low.

In order to resolve the above problem, a multi-matrix display system has been proposed.

Figure 2:
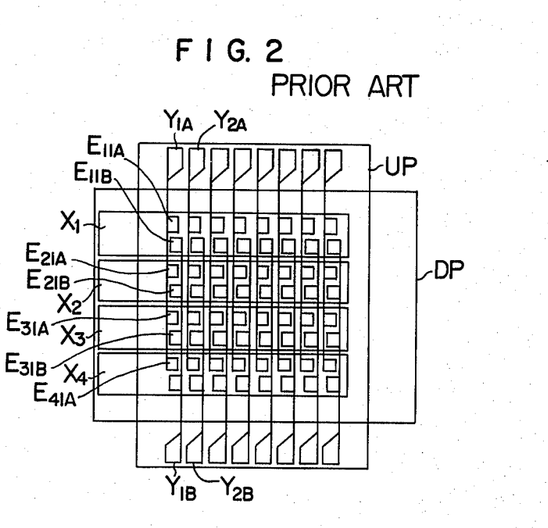
FIG. 2 shows a plan view illustrating a structure of a prior art double-matrix display panel.

The applicant has proposed a double-matrix display system. A configuration thereof is shown in FIG. 2, in which a liquid crystal material of the thickness of 10–20 $\mu$m is sealed between a pair of glass plates, an upper plate UP and a lower plate DP. On an inner surface of the upper plate UP, there are formed column electrodes $Y_{1A}$, $Y_{2A}$, $Y_{1B}$, $Y_{2B}$, ... and picture elements $E_{31A}$, $E_{31B}$, ..., and on an inner surface of the lower plate DP, there are formed transparent row electrodes $X_1$, $X_2$, $X_3$ and $X_4$. In this structure, one row electrode is common to two picture elements, e.g. the row electrode $X_3$ is common to two picture elements $E_{31A}$ and $E_{31B}$, and each pair of the picture elements is integrated with upper and lower column electrodes, e.g. the column electrode $Y_{1A}$ is integrated with the picture element $E_{31A}$ and the column electrode $Y_{1B}$ is integrated with the picture element $E_{31B}$. Such a structure is commonly referred to as a double-matrix type. When the row electrode $X_3$ is selected and other row electrodes $X_1$, $X_2$ and $X_4$ are not selected and brightness modulated signals are applied to the column electrodes $Y_{1A}$, $Y_{1B}$, ..., the brightnesses of the liquid crystal at positions corresponding to the picture elements $E_{31A}$, $E_{31B}$, ... can be controlled. In the double-matrix system, two rows such as the picture elements $E_{31A}$ and $E_{31B}$ in the above example can be displayed simultaneously so that the contrast is not lowered and the number of rows can be doubled.

In the structure of FIG. 2, however, the shape of the electrodes on the upper panel UP is complex and difficult to manufacture. Moreover, the precise alignment of the upper plate UP and the lower plate DP is required and hence the assembly work is also complicated.

Figure 3:
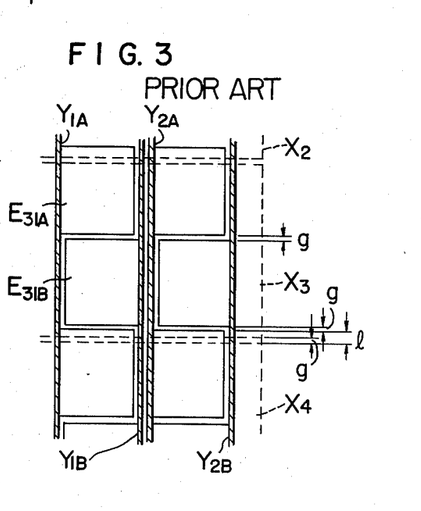
FIG. 3 shows an enlarged view of a portion of FIG. 2.

FIG. 3 shows an enlarged view of the electrodes when the upper plate UP is not aligned with the lower plate DP. In a normally aligned condition, gaps g of the row electrodes $X_3$, $X_4$, ... of the lower plate DP must coincide with gaps g of the picture elements on the upper plate UP. If the amount of misalignment l between the upper plate UP and the lower plate DP is larger than the gap g as shown in FIG. 3, a portion of each picture element laps with the adjacent row electrode so that undesired bright area appears at the lapped portion, deteriorating the quality of display. Accordingly, the distance l must be smaller than the gap g. However, since the gap g is in the order of 20 $\mu$m, the assembly work must be performed while one observes the assembly by a microscope. Therefore, the workability is bad.

While the structure and the associated drawback have been explained above for the liquid crystal display system, similar structural feature and drawback are observed in the display systems other than the liquid crystal display system.

Figure 4:
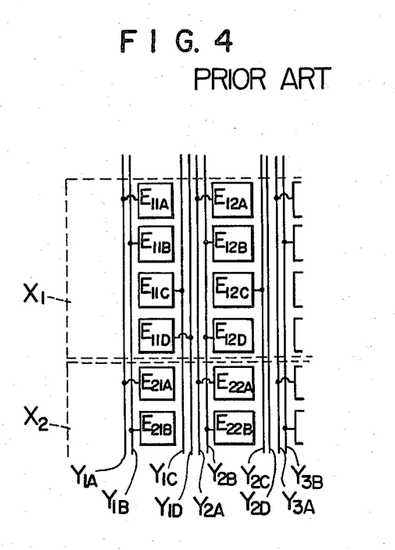
FIG. 4 shows a structure of a prior art quadri-matrix display panel.

FIG. 4 shows an example of a prior art quadri-matrix display panel, in which each of the row electrodes $X_1$, $X_2$, ... has a width which is four times as wide as the row electrode shown in FIG. 1 so that each electrode faces four rows of picture elements $E_{11A}$–$E_{11D}$. The picture elements $E_{11A}$, $E_{21A}$, ... are connected to the common column electrode $Y_{1A}$ and the picture elements $E_{11B}$, $E_{21B}$, ... are connected to the common column electrode $Y_{1B}$ and so on. In this quadri-matrix display panel, brightness modulated signals are applied to the column electrodes $Y_{1A}$, $Y_{1B}$, $Y_{1C}$, $Y_{1D}$, $Y_{2A}$, $Y_{2B}$, $Y_{2C}$, $Y_{2D}$, ... while the row electrode $X_1$ is selected so that the brightnesses of four rows of picture elements can be simultaneously controlled. Accordingly, for the same total number of picture elements as that of the system of FIG. 1 (hereinafter referred to as a simple matrix system), the firing period of each picture element can be extended by a factor of four and hence the brightness of the picture and the contrast ratio can also be improved by a factor of four.

In the display panel shown in FIG. 4, however, the column electrodes $Y_{1A}$ must jump over the column electrode $Y_{1B}$ at the points where it is connected to the picture elements $E_{11A}$, $E_{21A}$, ... (Similar situations occur for the other column electrodes $Y_{1D}$, $Y_{2D}$, ...) To this end, a multi-layer structure of a conductor and an insulator must be formed on the glass plate at each jumping point. Therefore, the fabrication is difficult and expensive.

Figure 5:
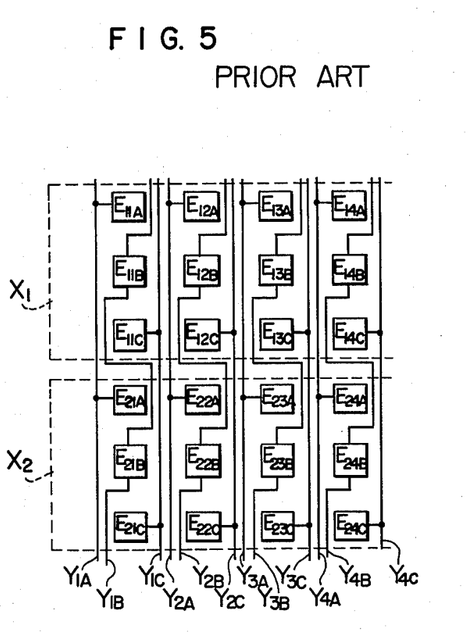
FIG. 5 shows a structure of a prior art triple-matrix display panel.

To resolve the above problem, a multi-matrix display panel as shown in FIG. 5 has been proposed. As seen from FIG. 5, this structure avoids the three-dimensional interconnection of the electrodes and allows for two-dimensional wiring. FIG. 5 shows an example of a triple-matrix display panel, in which like reference characters to those of FIG. 4 show like parts. In the structure of FIG. 5, in order to avoid the crossing of the electrodes in connecting the column electrode $Y_{1B}$ to the picture elements $E_{11B}$ and $E_{21}B$, the electrode $Y_{1B}$ passes on the left side of the picture element $E_{11C}$ and then detours on the right side of the picture element $E_{21A}$ before it reaches the picture element $E_{21B}$.

In this structure, therefore, the paths of the column electrodes are complicated and hence larger space is required for the wiring. Accordingly, the area available for the picture elements is reduced and hence, the mean brightness of the display panel is lowered. This cancels out the benefit of the multi-matrix system and poses a problem of difficulty in the fabrication.

The present invention overcomes the drawbacks encountered in the prior art systems.

The multi-matrix display panel of the present invention comprises a plurality of row electrodes, a plurality of column electrodes arranged transversely to each of said row electrodes, and a display material electrically excitable and arranged between the row electrodes and the column electrodes for constituting a plurality of picture elements to be displayed when said row and column electrodes are selectively energized. The brightness of each of the picture elements is controlled by selectively applying a signal between a corresponding row electrode and a corresponding column electrode. In accordance with the present invention, n rows of the picture elements are arranged to face each row of the row electrodes, and each column of the plurality of picture elements is provided with n column electrodes, where n is integer of at least 2 or not smaller than 2, and in front of any adjacent two rows of the row electrodes, a first one of each of the n column electrodes connects a picture element of a first row facing one of the row electrodes with a picture element of an nth row facing the other of the row electrodes, a second one of each of the n column electrodes connects a picture element of a second row facing the one of the row electrodes with a picture element of an (n−1)th row facing the other of the row electrode, and an nth one of each of the n column electrodes connects a picture element of an nth row facing the one of the row electrodes with a picture element of a first row facing the other of the row electrodes.

The multi-matrix display system using the above multi-matrix display panel of the present invention comprises a drive circuit for applying scanning signals to the plurality of row electrodes of the matrix and brightness modulated signals to the plurality of column electrodes to control the brightnesses of the selected picture elements.

It is an object of the present invention to provide a multi-matrix display panel of a structure which does not need the three-dimensional interconnection of the electrodes and the detouring wiring and which is easy to manufacture, and a display system using such a display panel.

It is another object of the present invention to integrate the opposing picture elements of two adjacent rows of the row electrodes to reduce the number of picture elements and to prevent the deterioration of the quality of display even when the display panel is assembled by an alignment work through the observation by naked eye.

The features of the present invention reside in the structure of the matrix display panel in which the sequence of connection of the column electrode to the picture elements is reversed from one row electrode to the next row electrode and the matrix display system constructed to reverse the sequence of application of the drive signals.

The present invention is now explained in detail with reference to the preferred embodiments thereof.

Figure 6:
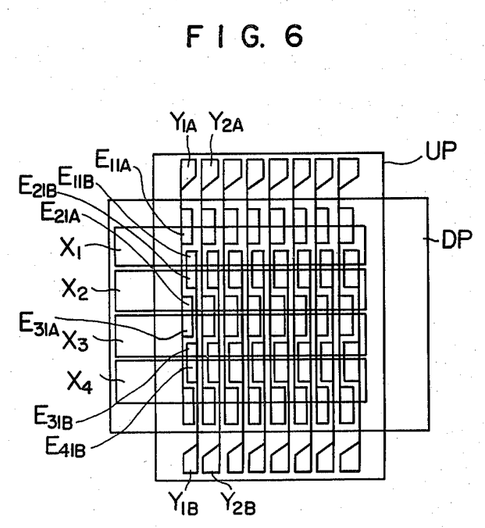
FIG. 6 shows a structure of a double-matrix display panel in accordance with the present invention.

FIG. 6 shows an embodiment of a double-matrix type liquid crystal matrix display panel in accordance with the present invention, in which like reference characters to those in FIG. 2 show like parts. In FIG. 6, the picture elements connected to the column electrode $Y_{1A}$ are denoted by $E_{11A}$, $E_{21A}$, ... and the picture elements connected to the column electrode $Y_{1B}$ are denoted by $E_{11B}$, $E_{21B}$, ... The column electrodes $Y_{2A}$, ... of the second and other columns and the picture elements $E_{12A}$, ... are similarly denoted.

As is apparent from FIG. 6, each picture element has a length which is twice as long as the picture element shown in FIG. 2 so that it partially overlaps with the two adjacent row electrodes (such as $X_1$ and $X_2$, $X_2$ and $X_3$, $X_3$ and $X_4$ ...). Thus, the picture elements on the adjacent row electrodes are interconnected. Accordingly, the picture elements $E_{11B}$ and $E_{21B}$, $E_{21A}$ and $E_{31A}$, $E_{31B}$ and $E_{41B}$ can be integrated and hence each picture element has the length which is twice as long as the picture element of FIG. 2. Further, as is apparent from FIG. 6, the picture elements facing the row electrode $X_1$ are arranged in the sequence of $E_{11A}$, $E_{11B}$, ... from the top to the bottom but the picture elements facing the next row electrode $X_2$ are arranged in the sequence of $E_{21B}$, $E_{21A}$, which is opposite to the sequence in the prior art panel shown in FIG. 2. The picture elements facing the row electrodes $X_3$ ... are similarly arranged.

According to the present embodiment, the size of the picture element is twice as large as that of the prior art panel and the number of the picture elements is one half of that of the prior art panel. Accordingly, the manufacture of the picture elements of the electrodes is facilitated to compare with the prior art panel.

Figure 7:
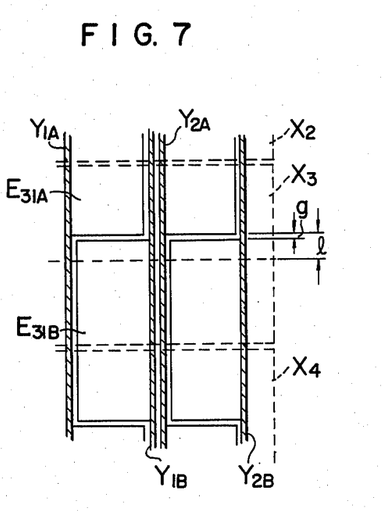
FIG. 7 shows an enlarged view of a portion of FIG. 6.

FIG. 7 shows an enlarged view of a portion of FIG. 6, in which the upper plate UP and the lower plate DP are misaligned from each other. In the present embodiment, even if the distance l of misalignment is larger than the gap g, only the size of the picture element fired is increased or decreased by the amount l and there is no risk that undesired picture elements are fired, unlike in the case of the prior art panel shown in FIG. 2. Accordingly, the distance l of misalignment need only be suppressed to an extent that appreciable unevenness of the size of the picture element is prevented. For example, in a television picture element display, the length of one side of the picture element is in the order of 1 mm. Accordingly, the distance l up to 200 $\mu$m, which is ten times as long as that in the prior art panel, is allowable. As a result, the alignment during the assembly work may be done by the observation through naked eye and hence the work efficiency can be materially improved. When the assembly is done automatically, a lower precision and cheaper assembling machine may be used.

Figure 8:
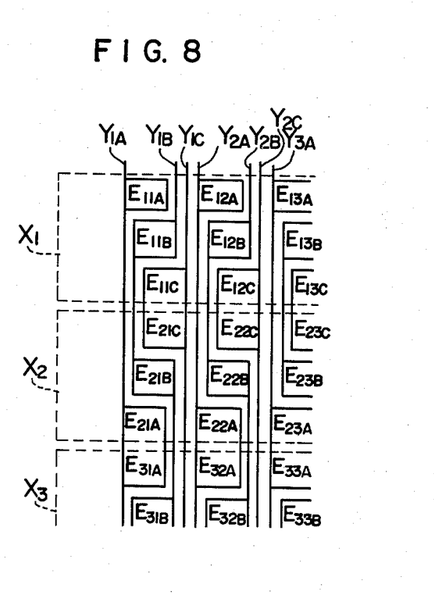
FIG. 8 shows a structure of a triple-matrix display panel in accordance with the present invention.

FIG. 8 shows a structure of a triple-matrix display panel of the present invention which may be applied to the triple-matrix display system. In FIG. 8, like reference characters to those in FIGS. 4 and 5 denote the parts having like functions. In FIG. 8, the picture elements connected to the column electrode $Y_{1A}$ are denoted by $E_{11A}$, $E_{21A}$, $E_{31A}$, ..., and the picture elements connected to the column electrode $Y_{1B}$ are denoted by $E_{11B}$, $E_{21B}$, ..., and the picture elements connected to the column electrode $Y_{1C}$ are denoted by $E_{11C}$, $E_{21C}$, ... The picture elements $E_{12A}$ ... for the column electrodes $Y_{2A}$ ... of the second and other columns are similarly denoted.

Like in the double-matrix display panel shown in FIG. 6, the picture elements facing the row electrode $X_1$ are arranged in the sequence of $E_{11A}$, $E_{11B}$ and $E_{11C}$ from the top to the bottom but the picture elements facing the row electrodes $X_2$ are arranged in the sequence of $E_{21C}$, $E_{21B}$, $E_{21A}$, which is opposite to the sequence in the prior art display panel shown in FIG. 5. The picture elements for the row electrode $X_3$ and other electrodes are similarly arranged. In general, the picture elements facing the odd-numbered row electrode $X_i$ are arranged in the sequence of $E_{ijA}$, $E_{ijB}$, $E_{ijC}$ ... (where i and j are integers) and the picture elements facing the even-numbered row electrode $X_i$ are arranged in the sequence of $E_{ijC}$, $E_{ijB}$, $E_{ijA}$. This system is hereinafter referred to as a multi-matrix system.

Figure 9:
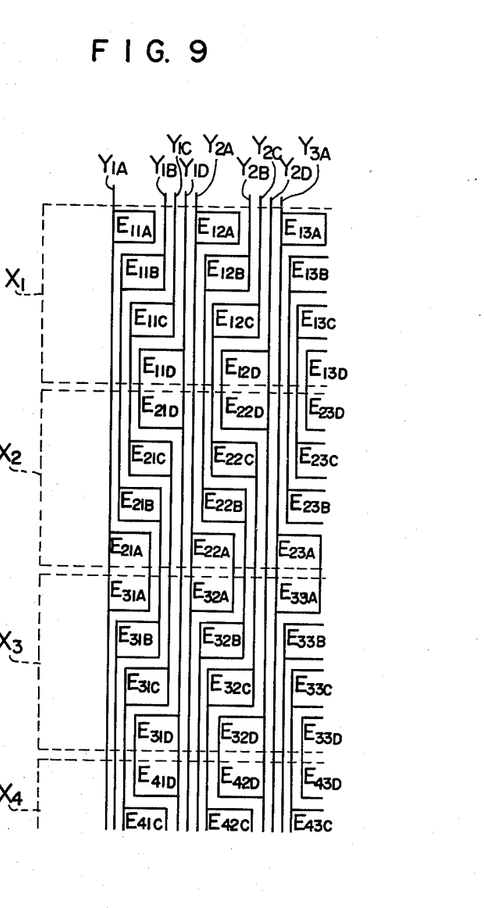
FIG. 9 shows a structure of a quadri-matrix display panel in accordance with the present invention.

FIG. 9 shows another embodiment of the present invention which shows a structure of a quadri-matrix system. In FIG. 9, like reference characters to those in FIGS. 4, 5 and 8 denote like parts. Again in this embodiment, the picture elements facing the odd-numbered row electrode $X_i$ are arranged in the sequence of $E_{ijA}$, $E_{ijB}$, $E_{ijC}$, $E_{ijD}$ and the picture elements facing the even-numbered row electrode $X_i$ are arranged in the sequence of $E_{ijD}$, $E_{ijC}$, $E_{ijB}$, $E_{ijA}$.

The connection of the picture elements is described in general. In an n-multiple-matrix, n rows of picture elements $E_{ijK}$ (where K=A, B, ... n) face any row electrode $X_i$. In connecting the picture elements facing the adjacent two row electrodes $X_i$ and $X_{i+1}$, the picture element constituting the first row facing the row electrode $X_i$, that is, the picture element $E_{ijA}$ is connected with the picture element constituting the last row facing the next row electrode $X_{i+1}$, that is, the picture element $E_{(i+1)jn}$, and the picture element constituting the second row facing the row electrode $X_1$, that is, the picture element $E_{ijB}$ is connected with the picture element constituting the next to the last row facing the row electrode $X_{i+1}$, that is, the picture element $E_{(i+1)j(n-1)}$. In general, the picture element constituting the k-th row facing the row electrode $X_i$, that is, the picture element $E_{ijk}$ is connected to the picture element constituting the k-th to the last row facing next row electrode $X_{i+1}$.

It is apparent from the above embodiment that the above structure does not need the three-dimensional interconnection of the picture elements (column electrodes) or the detouring wiring even in the double or higher order multiple matrix system.

Furthermore, according to the connecting method described above, since the picture element constituting the last row facing the row electrode $X_1$ is always connected with the picture element constituting the first row facing the row electrode $X_{i+1}$, those two picture elements can be integrated, as explained in FIG. 6. The picture elements $E_{11C}$ and $E_{21C}$, or $E_{21A}$ and $E_{31A}$ in FIG. 8 and the picture elements $E_{11D}$ and $E_{21D}$ or $E_{21A}$ and $E_{31A}$ in FIG. 9 are integrated in this manner.

In the prior art multi-matrix system, the picture element constituting the last row facing one row electrode (e.g. $E_{11D}$ in FIG. 4) and the picture element constituting the last row facing the next row electrode (e.g. $E_{21A}$ in FIG. 4) can not be integrated because they are not electrically connected. In the manufacture of the display panel, it is more or less inevitable that the lower plate DP on which the row electrode $X_i$ is arranged is misaligned to the upper plate UP on which the column electrode $Y_{jk}$ is arranged. In the prior art panel, if the top of the picture element $E_{21A}$, for example, is displaced away from the row electrode $X_2$ by the vertical misalignment the effective area of the picture element is reduced as explained in FIG. 3. As the degree of misalignment further increases until the top of the picture element $E_{21A}$ laps with the row electrode $X_1$, the lapped area is undesirably selected to fire. Thus, the quality of display is materially deteriorated.

On the other hand, in the multi-matrix system of the present invention in which the last picture element of the row electrode $X_1$ and the first picture element of the row electrode $X_{i+1}$ are integrated, even if the upper plate UP and lower plate DP are misaligned, only the ratio of areas of the picture elements, for example, $E_{11C}$ and $E_{21C}$ in FIG. 8 change but the effective area is not reduced or firing of undesired area does not occur.

Figure 10:
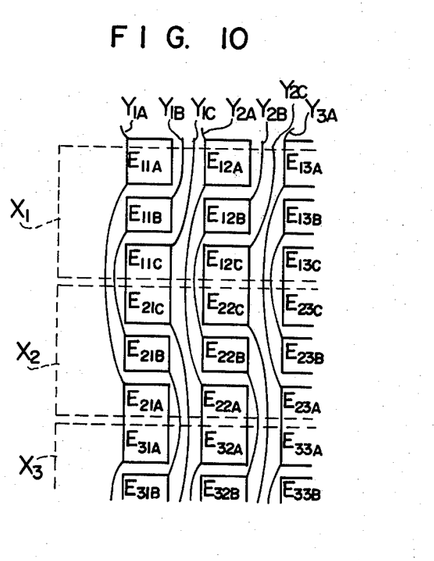
FIG. 10 shows a modification of FIG. 8.

FIG. 10 shows another embodiment of the display panel for the multi-matrix system of the present invention. In FIG. 10, like reference characters to those in FIGS. 4, 5, 8 and 9 denote like parts. In the embodiments of FIGS. 8 and 9, the column electrodes are linear. As a result, the picture elements are arranged in slightly curved manner, and hence the quality of display is slightly deteriorated. In the embodiment of FIG. 10, in order to avoid the above problem, the column electrodes are slightly bent so that the picture elements are arranged linearly. Furthermore, in FIG. 10, the contact area of the column electrode to the picture element is reduced to increase the effective area of the picture element. That is, the column electrode is almost in point contact with the picture element. In this case, however, if the contact area of the column electrode to the picture element is too small, the reliability of the contact is reduced. Therefore, the contact area between the column electrode and the picture element should have a certain lower limit of area.

When information is displayed by the multi-matrix display panel described above, a panel drive circuit therefor must be also changed.

An embodiment of a drive circuit used to drive the double-matrix display panel of the present invention shown in FIG. 6 is now explained.

Figure 11:
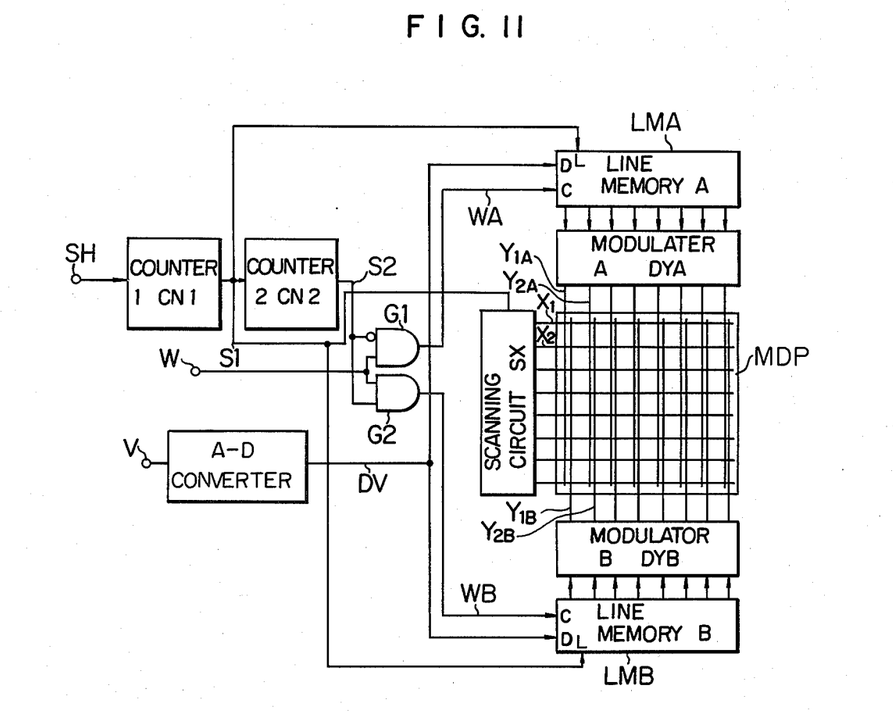
FIG. 11 shows a block diagram of a drive circuit for the double-matrix display panel shown in FIG. 6.
Figure 12:
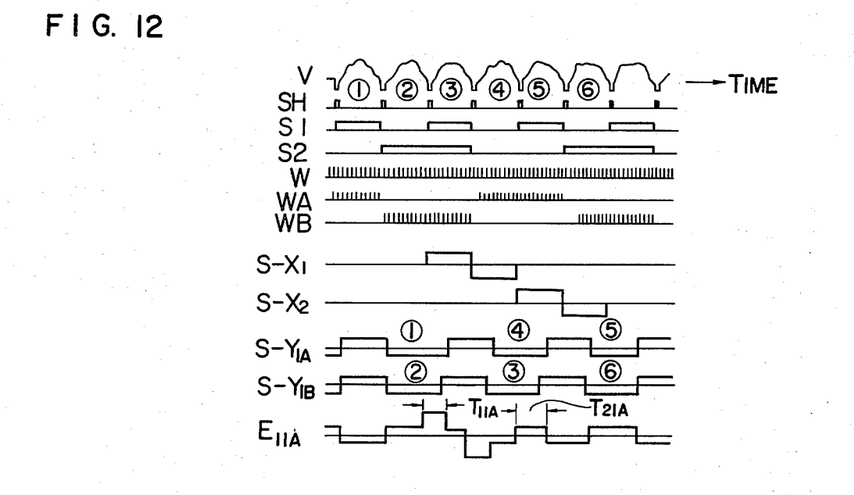
FIG. 12 shows a time chart for explaining the operation of FIG. 11.

FIG. 11 shows a block diagram of a drive circuit for driving the double-matrix display panel of the present invention, and FIG. 12 shows a time chart for illustrating the operation of the circuit of FIG. 11.

In the double-matrix display panel of the present invention shown in FIG. 6, the row electrode $X_1$ is first selected and the first row of brightness signals are applied to the column electrodes $Y_{1A}, Y_{2A}, \ldots$, and simultaneously therewith the second row of the brightness signals are applied to the column electrodes $Y_{1B}, Y_{2B}, \ldots$. Next, the row electrode $X_2$ is selected and the third row of the brightness signals are applied to the column electrodes $Y_{1B}, Y_{2B}, \ldots$ while the fourth row of the brightness signals are applied to the column electrodes $Y_{1A}, Y_{2A}, \ldots$. Similarly, when the odd-numbered row electrode is selected, the brightness signals for the upper row are applied to the column electrodes $Y_{1A}, \ldots$ while the brightness signals for the lower row are applied to the column electrodes $Y_{1B}, \ldots$, and when the even-numbered row electrode is selected, the brightness signals for the upper row are applied to the column electrodes $Y_{1B} \ldots$ while the brightness signals for the lower row are applied to the column electrodes $Y_{1A} \ldots$.

In FIG. 11, MDP denotes a matrix display panel comprising the upper plate UP and the lower plate DP shown in FIG. 6 and having the electrodes $X_1, X_2, Y_{1A}, Y_{2A}, Y_{1B}, Y_{2B} \ldots$ as described above.

A television video signal V having a waveform at the top line in FIG. 12 is applied to an A/D converter ADC where it is converted to a digital brightness signal DV, which may be a 4-bit binary number, the magnitude of which is proportional to the magnitude of the video signal V, that is, a brightness to be displayed. The digital brightness signal DV is applied to input terminals D of a pair of line memories LMA and LMB.

A horizontal synchronizing signal SH which is produced for each scanning field of the television as shown in FIG. 12 is applied to a binary counter CN1, an output S1 of which is applied to another binary counter CN2. As shown in FIG. 12, the output S1 of the binary counter CN1 has a cycle time which is twice as long as that of the signal SH and the output S2 of the binary counter CN2 has a cycle time which is four times as long as that of the signal SH.

The output S1 of the binary counter CN1 is further applied to a scanning circuit SX, which produces scanning signals in synchronism with the output S1 and applies them to the row electrodes X1, X2, . . . . The scanning signals applied to the row electrodes X1, X2, . . . from the scanning circuit SX are designated by S-$X_1$, S-$X_2$, . . . . As shown in FIG. 12, the scanning signal S-$X_1$ has a waveform which has A.C. square waves during the third and fourth periods of the video signal V (shown by circled numbers in FIG. 12) and assumes 0 volt in other periods. Similarly, the signals S-$X_2$, . . . have similar waveforms with the delay of two periods of the signal SH. In those signals, the presence of the square wave corresponds to the selection state and the absence (0 volt) corresponds to the non-selection state.

Another signal W in FIG. 11 is used to enable the line memories LMA and LMB and it is applied to gates $G_1$ and $G_2$. The write-enable signal W may comprise 400 pulses per period of the horizontal synchronizing signal SH. The output $S_2$ of the binary counter CN2 is applied to the other inputs of the gates $G_1$ and $G_2$. When the signal $S_2$ is "1", the write-enable signal W appears on a line WB connected to the output of the gate $G_2$, and when the signal $S_2$ is "0", the signal W appears on a line WA connected to the output of the gate $G_1$. Accordingly, as shown in FIG. 12, the write pulses WA and WB alternately produce a pulse train having a duration equal to two periods of the horizontal synchronizing signal SH. The write pulses WA and WB are applied to write signal input terminals C of the line memories LMA and LMB, respectively. The output $S_1$ of the binary counter $CN_1$ is applied to output control terminals L of the line memories LMA and LMB.

The line memories LMA and LMB each has a storage capacity of 400 words with one word consisting of four bits, and can output the 400 words in parallel. Each time the write pulse WA or WB is applied, one word of digital brightness signal at the data input terminal D is stored in the line memory LMA or LMB so that 400 words are stored in one cycle of the horizontal synchronizing signal SH. The output of each line memory changes parallelly for 400 words in synchronism with the rise in the signal $S_1$ at the output control terminal L and it does not change during the write operation. The line memory which operates in this manner may be realized by combination of a shift register and a latch register.

Since the line memories operate in the manner described above, 400 words of digital brightness signal are stored in the line memory LMA in the first period of the video signal V shown in FIG. 12, and 400 words of digital brightness signal are stored in the line memory LMB in the second period. Since there is no pulse rise in the output $S_1$ of the binary counter $CN_1$ during the first and second periods, the contents of the memories do not appear at the outputs thereof and they appear simultaneously at the beginning of the third period. Those outputs do not change during the third and fourth periods. Thus, during the third and fourth periods, the line memory LMA produces the digital brightness signal of the first period while the line memory LMB produces the digital brightness signal of the second period. On the other hand, during the third period, the digital brightness signal DV is written into the line memory LMB and during the fourth period, the digital brightness signal DV is written into the line memory LMA. Those signals are read out in the fifth and sixth periods.

Finally, modulators DYA and DYB receive 400-word data from the line memories LMA and LMB, respectively, and each supplies 400 brightness modulating signals to signal electrodes $Y_{1A}, Y_{2A}, Y_{1B}, Y_{2B}, \ldots$. The signals applied to those signal electrodes $Y_{1A}, Y_{2A}, Y_{1B}, Y_{2B}, \ldots$ are designated by S-$Y_{1A}$, S-$Y_{2A}$, S-$Y_{1B}$, S-$Y_{2B}$, . . . . The brightness modulating signals S-$Y_{1A}$, . . . each is an A.C. square wave having a period which is twice as long as the period of the horizontal synchronizing signal SH, like the scanning signals S-$X_1$, S-$X_2$, . . . but it is pulse phase modulated so that the phase thereof is lagged in proportion to the output magnitude of the line memory. For example, the pulse rise of the brightness modulating signal S-$Y_{1A}$ in the third and fourth periods of the video signal V is lagged by $T_{11A}$ as shown in FIG. 12, the lag time $T_{11A}$ being proportional to the output magnitude at the left end of the line memory LMA in the third and fourth periods. Since this output of the line memory LMA is proportional to the magnitude of the video signal V in the first period, the lag time $T_{11A}$ is proportional to the voltage at the left end in the first period of the video signal V. Similarly, the phase lag $T_{21A}$ of the signal S-$Y_{1A}$ in the fifth and sixth periods is proportional to the voltage at the left end in the fourth period of the video signal V. The circled numbers shown for the signals S-$Y_{1A}$ and S-$Y_{1B}$ in FIG. 12 indicate the periods of the video signal.

As an example of a voltage actually applied to the liquid crystal, a voltage $E_{11A}$ at the crosspoint of the row electrode $X_1$ and the column electrode $Y_{1A}$ (that is, $E_{11A} = (S-X_1) - (S-Y_{1A})$) is shown in FIG. 12. The brightness of the liquid crystal is proportional to a root-mean-square value of the applied voltage. For the voltage $E_{11A}$, a high voltage appears only for the period of $2 \cdot T_{11A}$ during the third and fourth periods in which the row electrode $X_1$ is selected. Accordingly, the brightness in this period can be controlled by controlling the lag time $T_{11A}$. Although the brightness modulating signal S-$Y_{1A}$ may be phase modulated during the non-selection period of the row electrode $X_2$, the r.m.s. value of the voltage $E_{11A}$ is constant and hence the brightness of the liquid crystal remains unchanged.

Through the operation described above, when the row electrode $X_1$ is selected, the brightness modulating signal corresponding to the voltage in the first period of the video signal V is applied to the column electrodes $Y_{1A}, Y_{2A}, \ldots$ and the brightness modulating signal corresponding to the voltage in the second period of the video signal V is applied to the column electrodes $Y_{1B}, Y_{2B}, \ldots$ so that the brightness of the respective crosspoints are controlled. When the row electrode $X_2$ is selected, the information in the third period is applied to the column electrodes $Y_{1B} \ldots$ and the information in the fourth period is applied. In this manner, the object of the present invention is attained.

An embodiment of a drive circuit for driving the reversal triple-matrix display panel shown in FIG. 8 or 10 is explained below.

Figure 13:
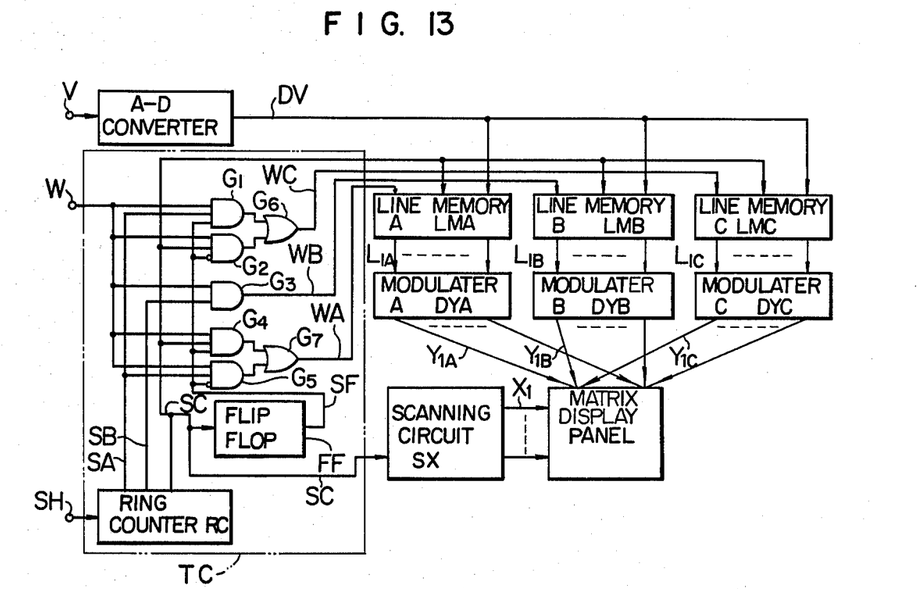
FIG. 13 shows a block diagram of a drive circuit for the triple-matrix display panel shown in FIG. 8.
Figure 14:
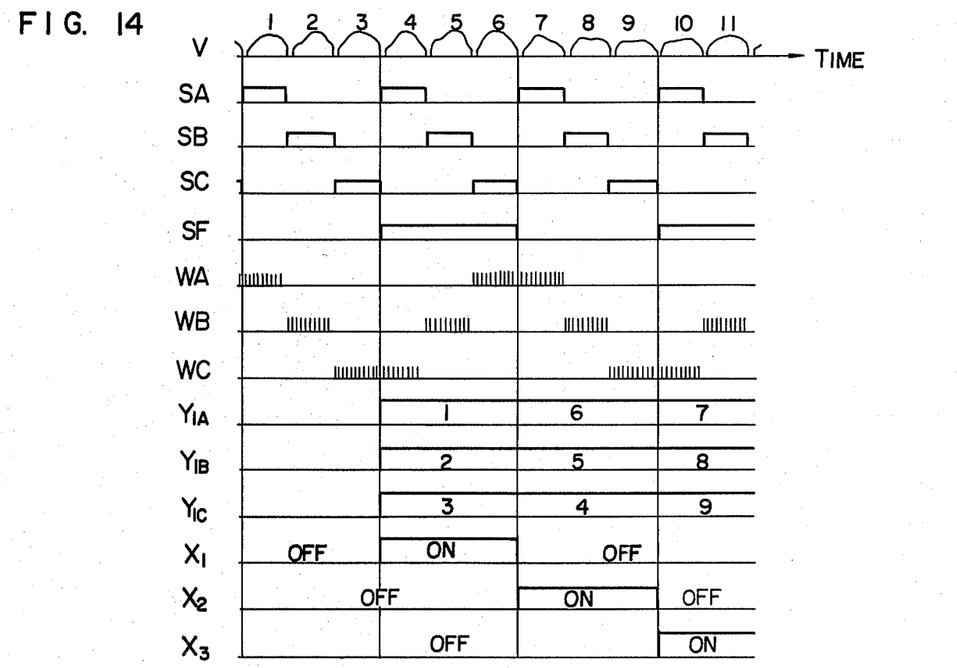
FIG. 14 shows a time chart for explaining the operation of FIG. 13.

FIG. 13 shows a block diagram of a drive circuit for driving the triple-matrix display panel of the present invention, and FIG. 14 shows a time chart for illustrating the operation thereof.

In FIG. 13, a video signal V, a clock pulse W and a horizontal synchronizing signal SH shown at the left end of the drawing are received from a television signal generation circuit, not shown (e.g. a television receiver, television camera or VTR).

The video signal V is transmitted sequentially from the first row of the picture elements, as shown in a waveform of FIG. 14, and a horizontal synchronizing signal is included in each row. The numbers shown at the top of FIG. 14 indicate the row numbers of the picture elements. The horizontal synchronizing signal SH is derived from the video signal V by extracting only the horizontal synchronizing signal. The clock pulse W which is a reference to the scan may be a pulse train of approximately 4 MHz.

As shown in FIG. 13, the video signal V is converted to a several-bit (seven-bit in the illustrated embodiment) digital video signal DV by an A/D converter ADC and supplied to three line memories LMA, LMB and LMC. The clock pulse W and the horizontal synchronizing signal SH are applied to a timing circuit TC, which will be described later in detail. It distributes the clock pulses W to each line of the picture elements to produce write pulses WA, WB and WC and also produces ring counter output SC which indicates the timing for each of the three rows of the picture elements. The write pulses WA, WB and WC are supplied to the line memories LMA, LMB and LMC, respectively. The ring counter output SC is supplied to all of the line memories LMA to LMC and a scanning circuit SX.

The line memories LMA to LMC store the digital video signal DV in response to the write pulses WA to WC. In the illustrated embodiment, since only the write pulse WA appears during the period of the first row of the video signal V, the first row of the video signal V is written into the line memory LMA. Similarly, the second row of the video signal is written into the line memory LMB, and the third row of the video signal is written into the line memory LMC. The storage capacity of each of the line memories LMA to LMC is a predetermined number of words equal to the number of columns of the picture elements to be displayed, and in the illustrated embodiment it is 400 words (with one word consisting of 7 bits). Each of the line memories LMA to LMC, after having been written, produces the 400 words simultaneously at line memory output $L_{1A}$-$L_{400A}$, $L_{1B}$-$L_{400B}$ or $L_{1C}$-$L_{400C}$ in synchronism with a trailing edge of the output SC of the ring counter RC. Each of the outputs of the line memories LMA to LMC changes for every 3H period (H being a scanning period for one row) and the output is maintained during the write operation of the line memory.

The three modulators DYA, DYB and DYC each receives the 400-words×7-bits output of the corresponding line memory and applies brightness control signals to the column electrodes $Y_{1A}$-$Y_{400A}$, $Y_{1B}$-$Y_{400B}$ or $Y_{1C}$-$Y_{400C}$ of the matrix display panel MDP as shown in FIG. 8. The output waveforms of the modulators DYA to DYC may change depending on the type of display medium (liquid crystal, EL or plasma) used in the display panel, but they are well known in the art and hence not explained here. As is apparent from the above description, during the 3H period immediately after the first, second and third rows of the video signal have been written into the line memories LMA, LMB and LMC, respectively, the modulating signals corresponding to the first row of the video signal are applied to the column electrodes $Y_{1A}$-$Y_{400A}$. This is illustrated in FIG. 14 for the column electrode $Y_{1A}$. The numbers shown therein correspond to the numbers indicative of the row numbers of the video signal V. Similarly, the modulating signals corresponding to the second and third rows are applied to the column electrodes $Y_{1B}$ and $Y_{1C}$, respectively.

The scanning circuit SX sequentially selects the row electrodes of the matrix display panel MDP starting from the row electrode $X_1$ in synchronism with the trailing edge of the output SC of the ring counter RC. This is illustrated by $X_1$ - $X_3$ in FIG. 14, in which "ON" period represents the selected state and "OFF" period represents the non-selected state. Those waveforms are well known like those of the column electrodes and hence they are not explained here. The selection period for each of the row electrodes $X_1$ - $X_3$ is equal to 3H, and the selection period for the first row electrode $X_1$ coincides with the period during which the modulating signals corresponding to the first, second and third rows of the video signals are applied to the column electrodes $Y_{1A}$, $Y_{1B}$ and $Y_{1C}$, respectively.

Accordingly, when the row electrode $X_1$ is being selected, the picture elements corresponding to the first, second and third rows of the video signals are selectively displayed at the picture elements $E_{11A}$, $E_{11B}$ and $E_{11C}$, respectively (and $E_{12A}$ and so on) of FIG. 8 or 10. During this period, the fourth, fifth and sixth rows of the video signal V are sequentially applied as shown in FIG. 14 and they are written into the line memories LMC, LMB and LMA, respectively since the write pulses WC, WB and WA appear in this sequence. Those information are read out during the next 3H period in which the row electrode $X_2$ is next selected. It is seen from the comparison of FIG. 14 and FIG. 8 that when the row electrode $X_2$ is being selected, the picture elements corresponding to the fourth row of the video signal are selectively displayed at the picture element $E_{21C}$ and those corresponding to the fifth and sixth rows are selectively displayed at the picture elements $E_{21B}$ and $E_{21A}$, respectively.

By constructing the drive circuit in the manner described above, normal picture image can be displayed with the multi-matrix display panel in which the connection of the picture elements is alternately reversed.

Finally, the operation of the timing circuit TC is explained in detail with reference to FIGS. 13 and 14. The timing circuit TC comprises the 3-bit ring counter RC, a 1-bit flip-flop FF and logical gates $G_1$ to $G_7$. The ring counter RC receives the horizontal synchronizing signal SH having the period equal to 1H and produces pulses SA, SB and SC (see FIG. 14) each having the period equal to 3H and the duration equal to 1H. The flip-flop FF receives the output SC of the ring counter RC and frequency-divides it by a factor of two to produce an output SF. The logical gates $G_1$ to $G_7$ response to the pulses SA, SB, and SC and SF to distribute the clock pulses W to the write pulses WA, WB and WC. The manner of distributor has been described above and it can be expressed by the logical expressions of the logical gates $G_1$ to $G_7$ as follows:

$$WA = W \cdot SA \cdot \overline{SF} + W \cdot SC \cdot SF \quad (1)$$

$$WB = W \cdot SB \quad (2)$$

$$WC = W \cdot SC \cdot \overline{SF} + W \cdot SA \cdot SF \quad (3)$$

where symbol "." represents a logical AND function, symbol "+" represents a logical OR function, and $\overline{SF}$ represents a logical NOT function of the output SF.

When it is desired to expand the system to the quadri-matrix system, for sets of line memories and modulators and a 4-bit ring counter RC are used, and the logical gates are constructed to distribute the clock pulses W to four write pulses. In general, a drive circuit for an n-multi-matrix system comprises n sets of line memories A, B, ... n−1, n and modulators and it is designed to reverse the write sequence for every n rows such as (A, B ... n−1, n), (n, n−1, ... B, A), (A, B, ... n−1, n).

While digital memories are used for the line memories LMA to LMC in the drive circuit shown in FIG. 13, the line memories may be analog memories such as charge coupled device (CCD) memories or bucket brigade device (BBD) memories. In this case, the A/D converter can be omitted.

Further, while the clock pulses are distributed to produce the required write pulses in the embodiment of FIG. 13, if the line memories have write enable terminals, the clock pulses may be applied directly to the line memories while the write sequence is controlled by separately controlling the write-enable terminals.

When the line memories are of shift register type, the circuit as shown in the above embodiment may be used as it is. When random access memories (RAM) are used as the line memories, the write pulses W may be applied to a counter to produce address signals, which may be applied to the line memories.

While the examples of the television image display by the liquid crystal display of field effect type or dynamic scatter type in which light transmission factor of light or scattered intensity of light changes with an applied voltage have been described above, the present invention can be applied to any matrix display in which material other than liquid crystal is filled to change optical characteristic such as an electroluminescence display (change of luminescence), an electrochromic display (change of reflection coefficient) or a plasma display (change of luminescence). The image to be displayed may include characters at a terminal of a computer system, in addition to a television image. The drive waveforms to be applied to the electrodes may be those which have been used in the prior art matrix display system and they are not limited to those shown in FIG. 6. The signal electrodes and the picture electrodes are not necessarily separated but they may be integrated. Furthermore, in addition to the combination of the rows and the columns, a bar graph may be displayed.

According to the present invention, since the electrodes for two picture elements on the two adjacent row electrodes on the substrate of the matrix panel can be integrated into one electrode, the manufacture of the electrodes is facilitated. Furthermore, even if the alignment of the upper and lower substrates is done with low precision, the quality of display is not degraded. Therefore, the assembly work is facilitated and the manufacturing cost can be reduced. Furthermore, since the three-dimensional interconnection of the electrodes or the detouring wiring is not required, the structure of the display panel which is easy to manufacture can be provided, and the matrix display system using that display panel can be provided.

I claim:

1. In a multi-matrix display system having a matrix display panel, said matrix display panel comprising:
   picture elements arranged in the form of a matrix having a plurality of rows and columns;
   a plurality of row electrodes each commonly connected to at least two columns of said picture elements;
   a plurality of column electrodes arranged transversely to each of said row electrodes; and
   a display material electrically excitable and arranged between said row electrodes and said column electrodes for constituting said picture elements to be displayed when said row and column electrodes are selectively energized;
   means for controlling the brightness of each of said picture elements by selectively applying a signal related to a level of desired brightness between a corresponding row electrode and one or more corresponding column electrodes, including means for sequentially scanning said row electrodes and means for varying said brightness signal in accordance with an applied video signal;

n rows of said picture elements being arranged to face each row of said row electrodes, and each column of said plurality of picture elements being provided with n column electrodes, where n is an integer of at least 2, and in front of any adjacent two rows of said row electrodes, a first one of each of said n column electrodes connects a picture element of a first row facing one of the row electrodes with a picture element of an nth row facing the other of the row electrodes, a second one of each of said n column electrodes connects a picture element of a second row facing the one of the row electrodes with a picture element of an (n−1) the row facing the other of the row electrodes, and an nth one of each of said n column electrodes connects a picture element of an nth row facing the one of the row electrodes with a picture element of a first row facing the other of the row electrodes.

2. A matrix display panel according to claim 1 wherein the picture element of the n-th row facing one of said two adjacent row electrodes and the picture element of the first row facing the other of said two adjacent row electrodes are connected and integrated together.

3. A matrix display panel according to claim 1 or 2 wherein n rows of picture elements are arranged linearly to face the respective rows of said row electrodes.

4. A matrix display system comprising:

a display panel including picture elements arranged in matrix having a plurality of rows and columns, a plurality of row electrodes commonly connected to at least two columns of said picture elements, a plurality of column electrodes arranged transversely to each of said row electrodes, and a display material electrically excitable and arranged between said row electrodes and at least one of said column electrodes for constituting a plurality of picture elements to be displayed when said row and column electrodes are selectively energized, and a drive circuit for selectively applying signals between said row electrodes and said column electrodes, said display panel having n rows of picture elements arranged to face the respective rows of said row electrodes, 2n rows of said picture elements facing any two adjacent rows of said row electrodes being reversed from one row electrode to the next row electrode by n column electrodes, where n is an integer of at least 2, and the first column electrode connecting the picture element of the first row facing the first row electrode with the picture element of the n-th row facing the second row electrode, the second column electrode connecting the picture element of the second row facing the first row electrode with the picture element of the (n−1)th row facing the second row electrode, and the n-th column electrode connecting the picture element of the n-th row facing the first row electrode with the picture element of the first row facing the second row electrode, and said drive circuit having n line memories, and n column electrodes per column of said picture elements being connected to different line memories, and each line memory memorizing picture data signals equal to the column number of the picture elements and simultaneously outputting all data in order to drive each column electrode, the order of memorizing said picture data signals in n line memories corresponding to the order of the line memory connected to first, second, . . . the nth column electrodes against said row electrode, and the following row electrode being connected in sequence to the n-th, (n−1)th, . . . second, first column electrodes.

5. A matrix display system according to claim 4 wherein said drive circuit includes an analog-to-digital converter for converting a video signal containing a horizontal synchronizing signal to a digital video signal, a timing circuit for receiving clock pulses and said horizontal synchronizing signal to distribute said clock pulses to each row of said picture elements to produce write pulses and a ring counter output indicative of a timing for each row of said picture element, line memories responsive to said write pulses to store said digital video signal for each row of said picture elements, modulators for receiving outputs of said line memories to apply brightness modulating signals to said column electrodes of said display panel, and a circuit for sequentially selecting said row electrodes of said display panel in synchronism with a trailing edge of said ring counter output.

* * * * *